United States Patent
Toyonaga et al.

(10) Patent No.: US 10,015,159 B2
(45) Date of Patent: Jul. 3, 2018

(54) TERMINAL AUTHENTICATION SYSTEM, SERVER DEVICE, AND TERMINAL AUTHENTICATION METHOD

(71) Applicant: Panasonic Intellectual Property Management Co., Ltd., Osaka (JP)

(72) Inventors: Saburo Toyonaga, Fukuoka (JP); Hiroyuki Tanaka, Fukuoka (JP); Kenjiro Ike, Fukuoka (JP); Masakatsu Matsuo, Fukuoka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 408 days.

(21) Appl. No.: 14/712,645

(22) Filed: May 14, 2015

(65) Prior Publication Data
US 2015/0350196 A1    Dec. 3, 2015

(30) Foreign Application Priority Data
May 27, 2014    (JP) .................................. 2014-108867

(51) Int. Cl.
*H04L 29/06*    (2006.01)
(52) U.S. Cl.
CPC ...... *H04L 63/0823* (2013.01); *H04L 63/0876* (2013.01)
(58) Field of Classification Search
None
See application file for complete search history.

(56) References Cited

U.S. PATENT DOCUMENTS

| | | | |
|---|---|---|---|
| 6,085,320 A | 7/2000 | Kaliski, Jr. | |
| 6,189,098 B1 | 2/2001 | Kaliski, Jr. | |
| 8,886,928 B2 | 11/2014 | Tada et al. | |
| 2005/0108551 A1* | 5/2005 | Toomey ................. | G06F 21/31 713/185 |
| 2005/0152543 A1 | 7/2005 | Shima et al. | |

(Continued)

FOREIGN PATENT DOCUMENTS

| | | |
|---|---|---|
| JP | 11-003033 A | 1/1999 |
| JP | 2006-119769 A | 5/2006 |

(Continued)

OTHER PUBLICATIONS

Dierkes, et al., "the Transport Layer Security (TLS) Protocol", version 1.2, Network Working Group, RFC 5246, Aug. 2008, p. 1-104.*

*Primary Examiner* — Jeffery Williams
(74) *Attorney, Agent, or Firm* — Seed IP Law Group LLP

(57) ABSTRACT

Provided is a terminal authentication system including a client terminal and a server device. The client terminal transmits first information based on secret information different for each client terminal and a client certificate including a hash value of the secret information which is derived from the secret information, to a server device. The server device receives the first information and the client certificate, derives a hash value from the secret information based on the first information using a unidirectional function, and authenticates the client terminal on the basis of the derived hash value and the hash value of the secret information which is included in the client certificate.

7 Claims, 4 Drawing Sheets

(56) References Cited

U.S. PATENT DOCUMENTS

| | | | | |
|---|---|---|---|---|
| 2006/0143702 A1* | 6/2006 | Hisada | ............... | H04L 12/4641 |
| | | | | 726/15 |
| 2008/0046735 A1* | 2/2008 | Nedeltchev | ......... | H04L 63/0823 |
| | | | | 713/173 |
| 2012/0102548 A1* | 4/2012 | Tamura | ................... | G06F 21/31 |
| | | | | 726/4 |
| 2013/0346742 A1 | 12/2013 | Tada et al. | | |
| 2014/0134980 A1* | 5/2014 | Singh | ................... | H04L 9/3263 |
| | | | | 455/411 |
| 2015/0326399 A1* | 11/2015 | Nigriny | ................ | H04L 9/3247 |
| | | | | 713/156 |
| 2016/0134622 A1* | 5/2016 | Singh | ................... | H04L 9/3263 |
| | | | | 726/6 |
| 2017/0201383 A1* | 7/2017 | Kim | ..................... | H04L 9/3263 |

FOREIGN PATENT DOCUMENTS

| | | |
|---|---|---|
| JP | 2009-290508 A | 12/2009 |
| JP | 5380583 B1 | 1/2014 |
| JP | 2005-138418 A | 4/2017 |

* cited by examiner

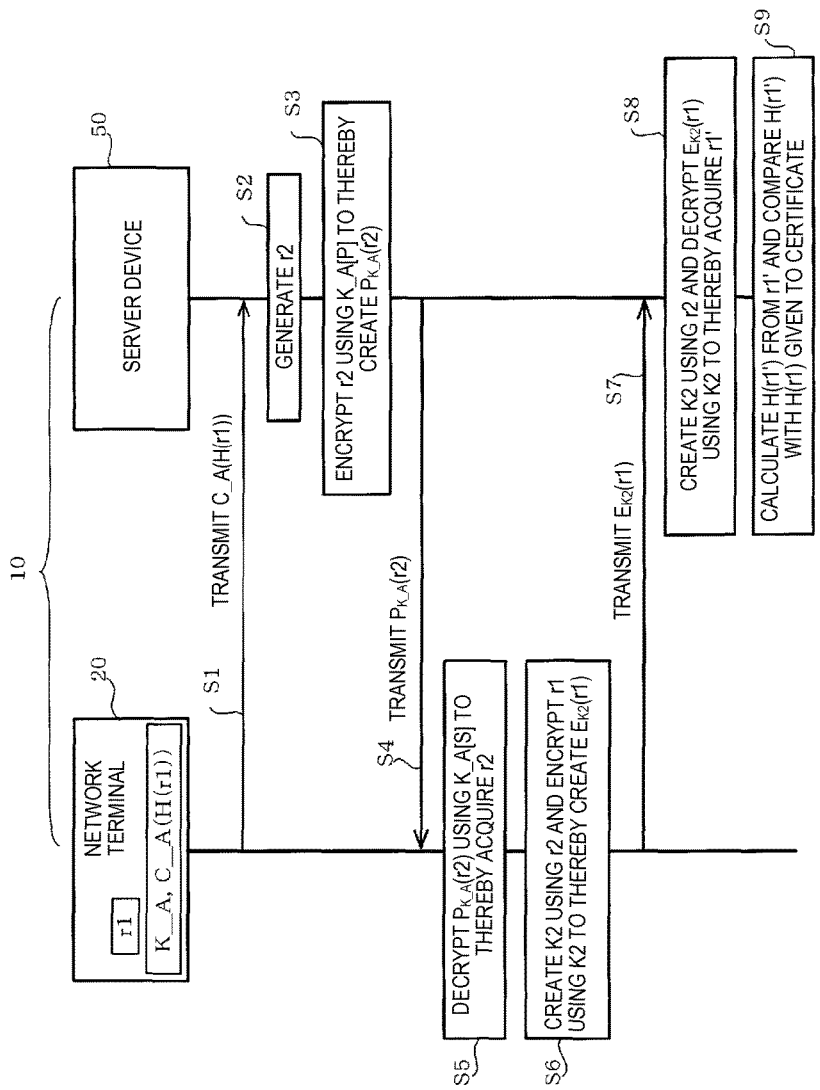

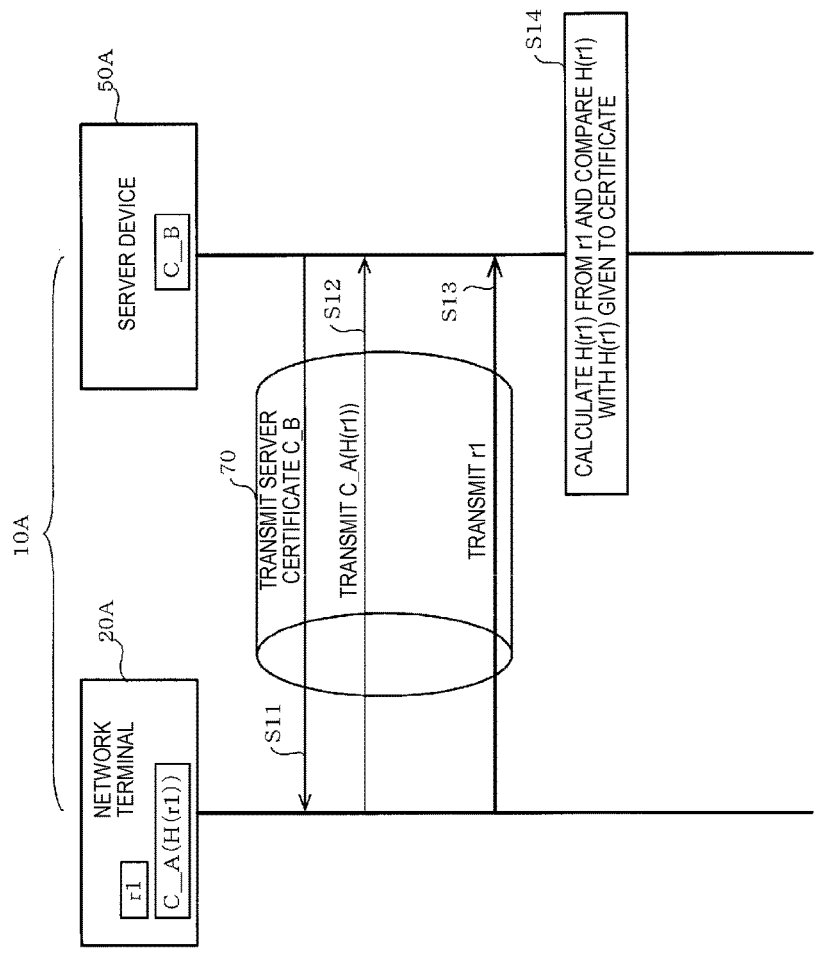

TERMINAL AUTHENTICATION SYSTEM, SERVER DEVICE, AND TERMINAL AUTHENTICATION METHOD

BACKGROUND OF THE INVENTION

1. Field of the Invention

The present invention relates to a terminal authentication system, a server device, and a terminal authentication method.

2. Description of the Related Art

Hitherto, an authentication process using a digital certificate has been performed in order to increase safety in network communication. The digital certificate is issued by, for example, a certificate authority (CA). In the authentication process using the digital certificate, it is possible to confirm the validity of the digital certificate on the basis of signature verification performed by the certificate authority.

The digital certificate includes, for example, a client certificate for confirming the validity of a client terminal and a server certificate for confirming the validity of a server device.

For example, in Japanese Patent No. 5380583, the following device authentication method is known as a method of authenticating a client terminal as a target for a client certificate to be issued. In this device authentication method, an information processing device including a storage device encrypts object information necessary for device authentication in a server by using device inherent information or information based on the device inherent information as an encryption key, and stores the encrypted object information. The information processing device decrypts the encrypted object information by using a decryption key corresponding to the encryption key used to generate the encrypted object information stored, and transmits the decrypted object information to the server. The server receives the object information from the information processing device and determines whether or not the received object information is correct.

In the device authentication method disclosed in Japanese Patent No. 5380583, it is difficult to specify a client terminal which is a target for a client certificate to be issued.

SUMMARY OF THE INVENTION

The present invention is contrived in view of the above-mentioned situations, and an object thereof is to provide a terminal authentication system, a server device, and a terminal authentication method which are capable of improving terminal authentication accuracy for authenticating a client terminal which is a target for a client certificate to be issued.

According to an aspect of the present invention, there is provided a terminal authentication system including a client terminal, and a server device. The client terminal and the server device are connected to each other through a network. The client terminal includes a storage unit that stores secret information different for each client terminal and a client certificate including a hash value of the secret information which is derived from the secret information, and a first communication unit that transmits first information based on the secret information and the client certificate to the server device. The server device includes a second communication unit that receives the first information and the client certificate from the client terminal, a unidirectional function processing unit that derives a hash value from the secret information based on the first information, using a unidirectional function, and an authentication processing unit that authenticates the client terminal on the basis of the derived hash value and the hash value of the secret information which is included in the client certificate.

According to another aspect of the present invention, there is provided a server device which is connected to a client terminal through a network. The server device includes a communication unit that receives first information based on secret information different for each client terminal and a client certificate including a hash value of the secret information which is derived from the secret information, from the client terminal; a unidirectional function processing unit that derives a hash value from the secret information based on the first information, using a unidirectional function; and an authentication processing unit that authenticates the client terminal on the basis of the derived hash value and the hash value of the secret information which is included in the client certificate.

According to still another aspect of the present invention, there is provided a terminal authentication method in a server device which is connected to a client terminal through a network. The terminal authentication method includes a step of receiving first information based on secret information different for each client terminal and a client certificate including a hash value of the secret information which is derived from the secret information, from the client terminal; a step of deriving a hash value from the secret information based on the first information, using a unidirectional function; and a step of authenticating the client terminal on the basis of the derived hash value and the hash value of the secret information which is included in the client certificate.

According to the present invention, it is possible to improve terminal authentication accuracy for authenticating a client terminal which is a target for a client certificate to be issued.

BRIEF DESCRIPTION OF DRAWINGS

FIG. 3 is a schematic diagram illustrating an example of a terminal authentication sequence according to the first exemplary embodiment; and FIG. 4 is a schematic diagram illustrating an example of a terminal authentication sequence according to a second exemplary embodiment.

DETAILED DESCRIPTION OF THE PREFERRED EMBODIMENTS

Figure 1:
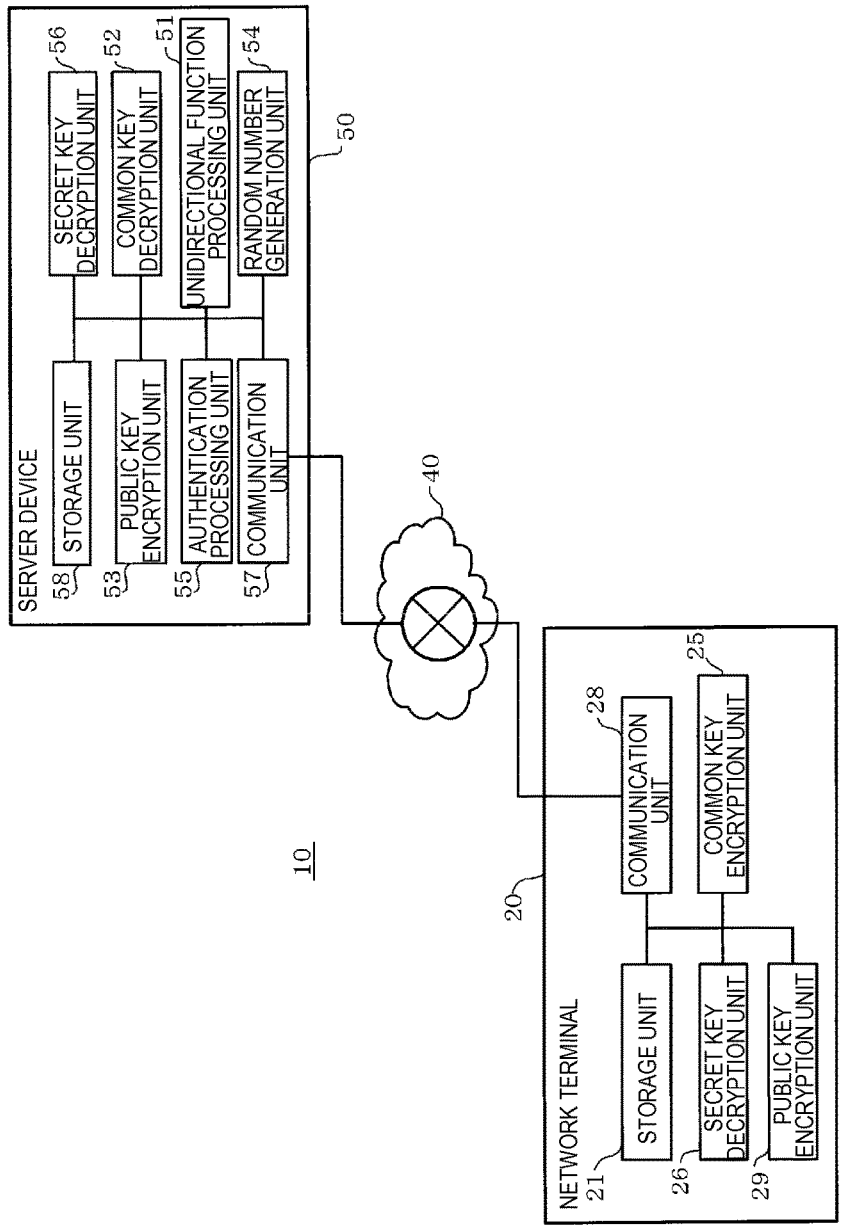
FIG. 1 is a block diagram illustrating a configuration example of a terminal authentication system according to a first exemplary embodiment.

Hereinafter, exemplary embodiments of the present invention will be described with reference to the accompanying drawings.

Background of Obtainment of Mode of the Present Invention

In recent years, commodities and systems that provide added value by connecting, for example, a multifunction machine, a camera, or a smart appliance (appliance connected to a network) to a network are increasing in number with the development of the Internet. A terminal connected to a network is called a network terminal.

When a network terminal provides a service using the Internet, it is preferable to encrypt the communication of the network terminal and to strictly perform authentication in order to defend third party's unauthorized use and attack on a service.

In general, a cryptocommunication protocol is widely used as a technique for defending wiretapping, manipulation, or impersonation. The cryptocommunication protocol is, for example, secure sockets layer (SSL)/transport layer security (TLS) using public key infrastructure (PKI). In the PKI, mutual devices connected to a network perform authentication using a digital certificate which is issued by a certificate authority (CA).

When a network terminal confirms whether or not a communication party connected thereto is the same as an issuer of a server certificate, the network terminal confirms a fully qualified domain name (FQDN) or a global internet protocol (IP) address which is written in a subject name of the server certificate. Thereby, the network terminal can confirm whether or not the communication party is a right communication party. The FQDN or the global IP address is written in the subject name of the server certificate, and a signature is written therein inclusive of the FQDN or the global IP address. Another server device having another FQDN or global IP address has a different server certificate.

On the other hand, when a server device confirms whether or not a communication party connected thereto is the same as a target for a client certificate to be issued, it is difficult to confirm whether or not the communication party is a right communication party.

For example, it is assumed that the server device confirms the target for a client certificate to be issued by identification information (a user name, a terminal name, and a media access control (MAC) address) which is written in the subject name of the client certificate.

In this case, since the identification information written in the subject name of the client certificate is transmitted by self-assessment from a client terminal, there is the possibility of the identification information being easily camouflaged. When an internet protocol (IP) address is used as the identification information, the IP address may be dynamically changed by a dynamic host configuration protocol (DHCP) server. Accordingly, when the identification information is camouflaged or changed, a target for a client certificate to be issued can use one client certificate in a plurality of terminals. For example, in license management performed by the server device, a plurality of client terminals can misuse an unauthorized license.

In the device authentication method disclosed in Japanese Patent No. 5380583, even when a certificate included in object information is encrypted using an encryption key and is stored, there is a concern of the certificate being camouflaged due to the leakage of the encryption key and the certificate at the time of registering the encryption key and the certificate in the client terminal. In this case, terminal authentication accuracy for authenticating the client terminal which is a target for a client certificate to be issued is deteriorated, and thus it is difficult to specify the client terminal.

Hereinafter, a description will be given of a terminal authentication system, a server device, and a terminal authentication method which are capable of improving terminal authentication accuracy for authenticating a client terminal which is a target for a client certificate to be issued.

A terminal authentication system according to an exemplary embodiment to be described below is applied to, for example, a system in which a server device performs the authentication of a client terminal.

First Exemplary Embodiment

FIG. 1 is a block diagram illustrating a configuration example of terminal authentication system 10 according to a first exemplary embodiment. Terminal authentication system 10 includes network terminal 20 and server device 50. Network terminal 20 and server device 50 are connected to each other through Internet 40. Network terminal 20 is an example of a client terminal. Internet 40 is an example of a network.

Network terminal 20 is, for example, a camera, a multi-function machine, a television, a smartphone, or a tablet terminal which is connected to a network. Network terminal 20 includes storage unit 21, common key encryption unit 25, secret key decryption unit 26, communication unit 28, and public key encryption unit 29. Communication unit 28 is an example of a first communication unit.

Storage unit 21 stores various pieces of information. Storage unit 21 stores, for example, a predetermined random number (for example, random number r1 to be described later), a secret key in a public key pair of network terminal 20, and a client certificate. The client certificate includes, for example, a hash value of the predetermined random number. The public key pair of network terminal 20 is used for encryption or decryption performed using a public key encryption method, and includes a secret key and a public key. The predetermined random number is managed as secret information. Storage unit 21 may store the public key in the public key pair of network terminal 20.

The client certificate includes, for example, the public key of network terminal 20, a predetermined random number, identification information (ID) of network terminal 20, and authority information. The identification information of network terminal 20 includes, for example, a serial number and a MAC address. The authority information includes, for example, an access right of network terminal 20 with respect to data stored in server device 50.

Common key encryption unit 25 encrypts data using a common key shared with server device 50. Common key encryption unit 25 encrypts data on the basis of a predetermined common key cryptographic algorithm (for example, advanced encryption standard (AES)). Common key encryption unit 25 is an example of a first data encryption unit.

Secret key decryption unit 26 decrypts the encrypted data which is encrypted on the basis of the public key of network terminal 20 using the secret key of network terminal 20. Secret key decryption unit 26 is an example of a first data decryption unit.

Communication unit 28 includes an interface for communicating with server device 50 through Internet 40. The interface includes, for example, a wired interface or a wireless interface. The wired interface includes, for example, a wired local area network (LAN) interface. The wireless interface includes Bluetooth (registered trademark) or a wireless LAN interface (for example, Wifi (registered trademark)).

Public key encryption unit 29 encrypts data using a public key of server device 50. Public key encryption unit 29 doubly encrypts the encrypted data which is encrypted by common key encryption unit 25 by the public key of server device 50. Public key encryption unit 29 is an example of a first data encryption unit. Public key encryption unit 29 may be omitted.

Network terminal 20 includes, for example, a central processing unit (CPU), a read only memory (ROM), and a random access memory (RAM). For example, the CPU realizes various types of functions in units within network terminal 20 by executing a program stored in the ROM.

Although not shown in FIG. 1, network terminal 20 may include a random number generation unit that generates a predetermined random number. The random number generation unit generates a random number at an arbitrary timing. The generated random number is stored in storage unit 21 as secret information.

Server device 50 includes unidirectional function processing unit 51, common key decryption unit 52, public key encryption unit 53, random number generation unit 54, authentication processing unit 55, secret key decryption unit 56, communication unit 57, and storage unit 58. Communication unit 57 is an example of a second communication unit.

Server device 50 stores a secret key in the public key pair of server device 50 and a server certificate, and performs the authentication of a client terminal. The public key pair of server device 50 is used for encryption or decryption performed using a public key encryption method, and includes a secret key and a public key. The server certificate includes, for example, the public key in the public key pair of server device 50.

Unidirectional function processing unit 51 derives (for example, calculates) a hash value from various pieces of data (for example, a random number including a random number sequence) by using, for example, a unidirectional function.

Common key decryption unit 52 decrypts encrypted data which is transmitted from network terminal 20 using, for example, a common key shared with network terminal 20. Common key decryption unit 52 is an example of a second data decryption unit.

Public key encryption unit 53 encrypts data using the public key of network terminal 20. Public key encryption unit 53 is an example of a second data encryption unit.

Random number generation unit 54 generates a random number sequence. Random number generation unit 54 may generate a pseudo-random number using, for example, a general pseudo-random number generation algorithm, or may generate a genuine random number using random number generation hardware.

Authentication processing unit 55 performs the authentication of network terminal 20. The authentication is also referred to as client authentication or terminal authentication. Authentication processing unit 55 compares the hash value calculated by unidirectional function processing unit 51 with a hash value of a random number included in a client certificate on the basis of, for example, the random number transmitted from network terminal 20. When the compared two hash values are the same as each other, authentication processing unit 55 determines that network terminal 20 is a regular terminal, in other words, a target for a client certificate to be issued. Thereby, network terminal 20 is authenticated.

For example, secret key decryption unit 56 decrypts the encrypted data which is encrypted on the basis of the public key of server device 50 by network terminal 20, using the secret key of server device 50. Secret key decryption unit 56 is an example of a second data decryption unit. Secret key decryption unit 56 may be omitted.

Communication unit 57 includes an interface for communicating with network terminal 20 through Internet 40. The interface includes, for example, a wired interface or a wireless interface. The wired interface includes, for example, a wired LAN interface. The wireless interface includes Bluetooth (registered trademark) or a wireless LAN interface (for example, Wifi (registered trademark)).

Storage unit 58 stores various pieces of information. Storage unit 58 stores, for example, the secret key of server device 50 and a server certificate.

Server device 50 includes, for example, a CPU, a ROM, and a RAM. For example, the CPU realizes various types of functions in units within server device 50 by executing a program stored in the ROM.

Next, details of a random number will be described.

Figure 2:
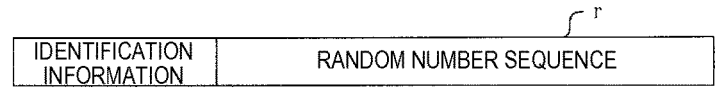
FIG. 2 is a schematic diagram illustrating a configuration example of a random number according to the first exemplary embodiment.

FIG. 2 is a schematic diagram illustrating a configuration example of random number r. For example, random number r may be a value obtained by combining a random number sequence generated by a random number generation unit of a device (network terminal 20 or server device 50) with identification information of the device that generates the random number sequence. In this case, the pieces of identification information (for example, a serial number and a MAC address) which are allocated to the device are combined with the random number sequence so that random number r is set to a unique value, and thus it is possible to suppress the generation of the same random number between a plurality of devices.

It is preferable that random number r has a size equal to or greater than an output value of a unidirectional function which is used in the calculation of a hash value. For example, when SHA256 is used as the unidirectional function, it is preferable that the random number r has a value equal to or greater than 32 bytes.

Random number r does not include the identification information of the device, and may be constituted by a random number sequence generated by the random number generation unit.

Next, an example of the operation of terminal authentication system 10 will be described.

FIG. 3 is a sequence diagram illustrating an example of the operation of terminal authentication system 10.

First, the definition of signs used in FIG. 3 will be described.

Signs r1 and r2 denote a random number. A random number sequence included in a random number includes, for example, a pseudo-random number and a genuine random number. For example, a general pseudo-random number generation algorithm or random number generation hardware may be used to generate a random number sequence. Federal information processing standardization (FIPS) 186-2 or national institute of standards and technology (NIST) special publication (SP) 800-90 may be used to generate a random number sequence. American National Standards Institute (ANSI) X9.31-1998 appendix C may be used to generate a random number sequence.

Signs K1 and K2 denote a common key. For example, when a common key is generated from a random number, the common key may be created by adding up key lengths using a unidirectional function and a pseudo-random number generator. For example, the half of a random number which serves as a password and the remaining half thereof which serves as a salt may be input to PBKDF2 to thereby generate a common key. PBKDF2 denotes password-based key derivation function 2 (request for comments (RFC) 2898 public key cryptography standards (PKCS) #5 v2).

Sign K_A denotes a public key pair of device A. Device A is either network terminal 20 or server device 50. Sign K_A[P] denotes a public key in public key pair K_A of device A. Sign K_A[S] denotes a secret key in public key pair K_A of device A.

Sign EK1(M) denotes a result of the encryption of plaintext M using common key K1. For example, password-based encryption scheme (PBES)1 or PBES2 is used for the encryption.

Sign $P_{K\_A}(M)$ denotes a result of the encryption of plaintext M using the public key of public key pair K_A. For example, a rivert shamir adleman (RSA) cryptogram, diffle-hellman (DH) key exchange, an elgamal cryptogram, or an elliptic curve cryptogram is used for the encryption.

Sign SK_A(M) denotes a result of the encryption of plaintext M using the secret key of public key pair K_A.

Sign H(M) denotes a hash value which is a result of the calculation of plaintext M using a unidirectional function. For example, message digest algorithm 5 (MD5), secure hash algorithm (SHA) 1, SHA256, or SHA512 may be used as the unidirectional function.

Sign C_A denotes a certificate of device A. When device A is network terminal 20, certificate C_A is a client certificate. When device A is server device 50, certificate C_A is a server certificate.

In the above description, signs used for device A have been mainly illustrated. However, when signs are used for device B in the same manner, the portion "A" which is the above-mentioned sign is appropriately changed to "B".

Next, a premise for performing a terminal authentication sequence of FIG. 3 will be described.

In FIG. 3, it is assumed that device A is network terminal 20 and device B is server device 50.

Before a terminal authentication sequence is performed, random number r1 is stored in storage unit 21 of network terminal 20 so as not to be opened to anyone. Being stored so as not to be opened to anyone is considered that, for example, storage unit 21 has tamper resistance. Random number r1 may be generated during the manufacture of network terminal 20 by a random number generation unit, not shown in the drawing, of network terminal 20, or may be generated dynamically. Random number r1 is an example of a second random number.

Secret key K_A[S] and client certificate C_A(H(r1)) of network terminal 20 are stored in network terminal 20. Hash value H(r1) of random number r1 is embedded in, for example, a subject column of client certificate C_A(H(r1)).

In network terminal 20, the authentication (server authentication) of server device 50 has already succeeded. A well-known server authentication method is used for the server authentication. In server authentication, network terminal 20 may or may not acquire a server certificate. The well-known server authentication method includes, for example, authentication using a server certificate and authentication using a URL.

A communication path between network terminal 20 and server device 50 may be a secure communication path or may be a non-secure communication path. The secure communication path includes, for example, a communication path which is encrypted on the basis of secure sockets layer (SSL)/transport layer security (TLS).

Communication between network terminal 20 and server device 50 may be performed through a relay device (for example, a proxy server or a network address translation (NAT) router).

First, in network terminal 20, communication unit 28 transmits client certificate C_A(H(r1)) to server device 50 (S1).

In server device 50, communication unit 57 receives client certificate C_A(H(r1)). Random number generation unit 54 generates a random number sequence (an example of a first random number sequence) (S2). Public key encryption unit 53 encrypts random number r2 including the generated random number sequence using public key K_A[P] of network terminal 20 which is given to client certificate C_A(H(r1)) to thereby create encrypted random number $P_{K\_A}(r2)$ (S3). Random number r2 is an example of a first random number. Communication unit 57 transmits encrypted random number $P_{K\_A}(r2)$ to network terminal 20 (S4).

In network terminal 20, communication unit 28 receives encrypted random number $P_{K\_A}(r2)$. Secret key decryption unit 26 decrypts encrypted random number $P_{K\_A}(r2)$ using secret key K_A[S] of network terminal 20 to thereby acquire random number r2 (S5). Common key encryption unit 25 creates common key K2 using random number r2 and encrypts random number r1 using common key K2 to thereby create encrypted random number $E_{K2}(r1)$ (S6). Communication unit 28 transmits encrypted random number $E_{K2}(r1)$ to server device 50 (S7). Encrypted random number $E_{K2}(r1)$ is an example of first information based on secret information.

In S6, common key encryption unit 25 may create common key K1 by random number r1 and may encrypt random number r2 by common key K1 to thereby create encrypted random number $E_{K1}(r2)$.

In server device 50, communication unit 57 receives encrypted random number $E_{K2}(r1)$. Common key decryption unit 52 creates common key K2 using random number r2 and decrypts encrypted random number $E_{K2}(r1)$ using common key K2 to thereby acquire random number r1' (S8).

In order to indicate a value obtained by decryption, calculation, or the like which is performed by server device 50 in distinction from a value which is registered or generated by network terminal 20, " ' " is added to the value (for example, random number r1) (the same applies hereinafter).

In server device 50, unidirectional function processing unit 51 derives (for example, calculates) hash value H(r1') from random number r' acquired in S8 by using a unidirectional function. Authentication processing unit 55 compares the acquired hash value H(r1') with hash value H(r1) given to client certificate C_A(H(r1)) to thereby perform terminal authentication (S9).

For example, when hash value H(r1') and hash value H(r1) conform to each other, authentication processing unit 55 determines that the authentication has succeeded. Thereby, it is possible to specify network terminal 20 as a regular terminal for which a client certificate is issued. The acquired random number r1' may be discarded after hash value H(r1') is derived.

Server device 50 includes a database in which terminal information (for example, identification information and authority information) of network terminal 20 is registered in association with hash value H(r1), and may acquire terminal information from hash value H(r1). Server device 50 may have access to a database server that manages the database other than server device 50 to thereby acquire terminal information of network terminal 20. Thereby, it is possible to manage information (for example, access right) regarding network terminal 20 and to further improve security.

According to terminal authentication system 10, server device 50 can improve terminal authentication accuracy for authenticating network terminal 20 which is a target for a client certificate to be issued.

For example, even when a person (third party) other than the terminal owner of network terminal 20 stores secret key K_A[S] and client certificate C_A(H(r1)) of network terminal 20, it is difficult to impersonate network terminal 20 if the person does not acquire secret information (for example, random number r1).

Even when secret key K_A[S] or client certificate C_A (H(r1)) is illegally used by a third party and is duplicated, secret key K_A[S] and client certificate C_A(H(r1)) are used for the encryption, decryption, and the like of the secret information and are not targets to be authenticated, and thus it is possible to prevent a terminal which is a third party from being the authenticated as network terminal 20. Accordingly, it is possible to secure security. It is possible to reduce the cost for embedding secret key K_A[S] or client certificate C_A(H(r1)) of network terminal 20 in network terminal 20.

A terminal authentication sequence is performed using random number r2, and thus the value of random number r2 changes every time the sequence is performed. Accordingly, encrypted random number $P_{K\_A}(r2)$ transmitted from server device 50 in S4 and encrypted random number $E_{K2}(r1)$ transmitted in S7 change every time. Therefore, even when pieces of information ($P_{K\_A}(r2)$ and $E_{K2}(r1)$) which are transmitted through a network are leaked, the value of $E_{K2}(r1)$ changes every time, and thus it is possible to increase resistance to a reply attack.

In the present exemplary embodiment, at least one of identification information and authority information of network terminal 20 may be embedded in client certificate C_A(H(r1)). In this case, server device 50 can acquire the identification information and the authority information by an authenticated client certificate. When the identification information and the authority information are added to information other than a client certificate, there is the possibility of the pieces of information being improved. The identification information and the authority information are added to the client certificate, and thus it is possible to improve security and the reliability of the identification information and the authority information.

In the present exemplary embodiment, in S7 of FIG. 3, network terminal 20 may doubly encrypt an encrypted random number when the encrypted random number is transmitted to server device 50, to thereby increase the security thereof.

Specifically, in network terminal 20, in S6, public key encryption unit 29 may encrypt random number r1 using public key K_B[P] of server device 50 to thereby create encrypted random number PK_B(r1). Common key encryption unit 25 may create common key K1 by random number r2 and may encrypt encrypted random number PK_B(r1) by common key K1 to thereby create double encrypted random number $E_{K2}(PK\_B(r1))$. In S7, communication unit 28 may transmit double encrypted random number $E_{K2}(PK\_B(r1))$ to server device 50.

In this case, network terminal 20 acquires server certificate C_B before the process of S6, and stores the acquired server certificate in, for example, storage unit 21. Public key K_B[P] of server device 50 is included in server certificate C_B.

In server device 50, communication unit 57 may receive double encrypted random number $E_{K2}(PK\_B(r1))$. In S8, common key decryption unit 52 may decrypt double encrypted random number $E_{K2}(PK\_B(r1))$ by random number r2. Secret key decryption unit 56 may decrypt encrypted random number PK_B(r1) using secret key K_B[S] of server device 50 to thereby acquire random number r1'.

Encryption is performed using public key K_B[P] of server device 50, and thus even when a third party wiretaps communication data and it is assumed that the third party has K_A, the third party cannot calculate random number r2 if the third party does not have secret key K_B[S] of server device 50. Therefore, it is not possible to acquire random number r1. Accordingly, server device 50 fails in terminal authentication, and thus it is possible to suppress the misidentification of the third party as network terminal 20 and to further improve security.

In the present exemplary embodiment, server device 50 may acquire a route certificate of network terminal 20 from a predetermined certificate authority other than network terminal 20 and store the route certificate. Server device 50 may compare a signature of a client certificate which is acquired from network terminal 20 with a signature of the route certificate to thereby authenticate the validity of the client certificate. Thereby, it is possible to further improve the reliability of terminal authentication.

Second Exemplary Embodiment

In a terminal authentication system according to a second exemplary embodiment, the same components as those in the first exemplary embodiment will be denoted by the same reference numerals and signs, and a description thereof will be omitted or simplified. Terminal authentication system 10A of the present exemplary embodiment includes network terminal 20A and server device 50A. Network terminal 20A and server device 50A are connected to each other through Internet 40.

Although a detailed configuration example of terminal authentication system 10A is not shown in the drawing, network terminal 20A may not include common key encryption unit 25, secret key decryption unit 26, and public key encryption unit 29, as compared to network terminal 20. Storage unit 21 may not store secret key K_A[S]. Server device 50A may not include common key decryption unit 52, public key encryption unit 53, random number generation unit 54, and secret key decryption unit 56, as compared to server device 50.

FIG. 4 is a sequence diagram illustrating an example of a terminal authentication sequence performed by terminal authentication system 10A. FIG. 4 is a modified example of FIG. 3, and thus a description of the same premise and processes as those in FIG. 3 will be omitted or simplified.

In FIG. 4, as a premise, secure communication path 70 is established between network terminal 20A and server device 50A. Secure communication path 70 includes, for example, a communication path which is encrypted on the basis of SSL/TLS.

Network terminal 20A acquires server certificate C_B from server device 50A in advance (S11), and the authentication of server device 50A has succeeded.

In network terminal 20A, communication unit 28 transmits client certificate C_A(H(r1)) to server device 50A (S12). Communication unit 28 transmits random number r1 to server device 50A (S13). Random number r1 is an example of first information based on secret information.

In server device 50A, communication unit 57 receives client certificate C_A(H(r1)) and random number r1. Unidirectional function processing unit 51 calculates hash value H(r1) from random number r1 which is acquired in S13, using a unidirectional function. Authentication processing unit 55 compares the calculated hash value H(r1) with hash value H(r1) given to client certificate C_A(H(r1)) to thereby perform terminal authentication (S14).

For example, when both hash values H(r1) conform to each other, authentication processing unit 55 determines that the authentication has succeeded. Thereby, it is possible to specify network terminal 20A as a regular terminal for which a client certificate is issued.

In this manner, when encrypted secure communication path 70 is established between network terminal 20A and server device 50A, network terminal 20A transmits client certificate C_A(H(r1)) and random number r1 to server device 50A. Thereby, server device 50A can easily authenticate network terminal 20A.

According to terminal authentication system 10A, an authentication target is not only information included in a client certificate but also secret information (for example, random number r1) which is stored in network terminal 20A. Accordingly, if a third party does not acquire secret information (for example, random number r1) in spite of holding client certificate C_A(H(r1)) of network terminal 20A, it is difficult to impersonate network terminal 20A. Therefore, server device 50A can specify network terminal 20A which is a target for a client certificate to be issued and to improve terminal authentication accuracy. Since components of network terminal 20A and server device 50A can be reduced, it is possible to simplify the configuration of terminal authentication system 10A.

Although various embodiments have been described with reference to the drawings, it is needless to say that the present invention is not limited to such examples. It is obvious to those skilled in the art that various changed or modified examples can be made within the scope described in claims, and it is understood that these examples still fall within the technical scope of the present invention.

For example, in the above-described exemplary embodiments, the network is Internet 40, but may be another network (for example, a LAN).

For example, in the above-described exemplary embodiments, a predetermined random number is used as secret information, but the secret information may not be a random number as long as the secret information is determined for each of network terminals 20 and 20A.

The present invention is useful for a terminal authentication system, a server device, a terminal authentication method, and the like which are capable of improving terminal authentication accuracy for authenticating a client terminal which is a target for a client certificate to be issued.

What is claimed is:

1. A terminal authentication system comprising:
   a client terminal; and
   a server device,
   wherein the client terminal and the server device are connected to each other through a network,
   wherein the client terminal includes:
      a storage that, in operation, stores a secret key of the client terminal, secret information for the client terminal and a client certificate including a public key of the client terminal and a hash value which is derived from the secret information, and
      a first transceiver that is coupled to the storage and that, in operation, transmits the client certificate to the server device, and
   wherein the server device includes:
      a second transceiver,
      a random number generator that, in operation, generates a first random number in a case that the second transceiver receives the client certificate from the client terminal,
      first data encryption processor that, in operation, encrypts the first random number using the public key of the client terminal which is included in the client certificate; and
   wherein the second transceiver transmits the encrypted first random number to the client terminal, and
   wherein the client terminal further includes:
      a first data decryption processor that, in operation, decrypts the encrypted a first random number using the secret key of the client terminal to thereby acquire the first random number in a case that the first transceiver receives the encrypted first random number from the server device, and
      a second data encryption processor that, in operation, encrypts the secret information using a first shared key based on the first random number, and
   wherein the server device further includes:
      a second data decryption processor that, in operation decrypts the encrypted secret information using a second shared key based on the first random number to thereby acquire the secret information, in a case that the second transceiver receives the encrypted secret information from the client terminal,
      a unidirectional function processor that is coupled to the second transceiver and that, in operation, derives a hash value from the encrypted secret information, using a unidirectional function, and
      an authentication processor that is coupled to the unidirectional function processor and that, in operation, authenticates the client terminal based on the derived hash value and the hash value of the secret information which is included in the client certificate.

2. The terminal authentication system of claim 1, wherein the secret information includes a second random number.

3. The terminal authentication system of claim 1, wherein the client certificate includes at least one of identification information of the client terminal and authority information.

4. A server device which is connected to a client terminal through a network, the server device comprising:
   a transceiver;
   a random number generator that, in operation, generates a first random number in a case that the transceiver receives a client certificate including a public key of the client terminal and a hash value which is derived from secret information stored by the client terminal, from the client terminal;
   a data encryption processor that, in operation, encrypts the first random number using the public key of the client terminal which is included in the client certificate, wherein the transceiver transmits the encrypted first random number to the client terminal;
   a data decryption processor that, in operation decrypts encrypted secret information, which was encrypted by the client terminal using a first shared key based on the first random number, using a second shared key based on the first random number to thereby acquire the secret information, in a case that the transceiver receives the encrypted secret information from the client terminal;
   a unidirectional function processor that is coupled to the transceiver and that, in operation, derives a hash value from the encrypted secret information, using a unidirectional function; and
   an authentication processor that is coupled to the unidirectional function processor and that, in operation, authenticates the client terminal based on the derived hash value and the hash value of the secret information which is included in the client certificate.

5. A terminal authentication method in a server device which is connected to a client terminal through a network, the terminal authentication method comprising:
   receiving a client certificate including a public key of the client terminal and a hash value which is derived from secret information stored by the client, from the client terminal;
   generating a first random number, responsive to the receiving of the client certificate including the public key of the client terminal and the hash value which is derived from the secret information stored by the client, from the client terminal;

encrypting the first random number using the public key of the client terminal which is included in the client certificate;

transmitting the encrypted first random number to the client terminal;

decrypting encrypted secret information, which was encrypted by the client terminal using a first shared key based on the first random number, using a second shared key based on the first random number to thereby acquire the secret information, in a case that the transceiver receives the encrypted secret information from the client terminal;

deriving a hash value from the encrypted secret information, using a unidirectional function; and authenticating the client terminal based on the derived hash value and the hash value of the secret information which is included in the client certificate.

6. The terminal authentication system of claim 1, wherein each of the first shared key and the second shared key is a common key generated using the first random number.

7. The terminal authentication system of claim 1,
wherein the first shared key is a public key of the server device and the first random number, and
wherein the second shared key is a secret key of the server device and the first random number, and wherein
the second data encryption processor, in operation, encrypts the secret information using the public key of the server device and the first random number, and
the second data decryption processor, in operation, decrypts the encrypted secret information using the secret key of the server of the server device and the first random number.

* * * * *